July 7, 1970 U. PRIEL ET AL 3,519,810

LOGIC ELEMENT (FULL ADDER) USING TRANSISTOR TREE-LIKE CONFIGURATION

Filed Feb. 14, 1967

INVENTORS
Ury Priel
James W. Hively

BY

Mueller, Aichele & Rauner

ATTY'S

United States Patent Office 3,519,810
Patented July 7, 1970

3,519,810

LOGIC ELEMENT (FULL ADDER) USING TRANSISTOR TREE-LIKE CONFIGURATION

Ury Priel and James W. Hively, Phoenix, Ariz., assignors to Motorola, Inc., Franklin Park, Ill., a corporation of Illinois Filed Feb. 14, 1967, Ser. No. 615,997
Int. Cl. G06f 7/50
U.S. Cl. 235—176 10 Claims

ABSTRACT OF THE DISCLOSURE

A logic element constructed in a transistor tree-like configuration wherein the transistors are operatively biased to switch in the high speed, non-saturating current mode. Binary digits are applied to differentially connected transistors in the tree-like arrangement to generate logic in a serial manner down the transistor tree and generate output functions and complements at the output of the logic element.

This invention relates generally to digital logic circuitry and more particularly to a full adder constructed using differentially connected transistors in multiple levels of logic. These transistors are connectable to sources of binary logic signals and biased to switch in the non-saturating current mode.

BACKGROUND OF THE INVENTION

Non-saturating full adders which have been constructed using a combination of individual half adders are known in the art of digital logic. For example, it is known to provide a full adder using three discrete half adders. However, a full adder implementation which utilizes three half adders is considerably slower and consumes more power than the full adder to be described herein. The prior art full adder which is constructed using three half adders also has a relatively low speed-power product, a commonly used figure of merit in digital circuits. The speed-power product of the full adder according to this invention exceeds the speed-power product of the prior art full adder implemented using three half adders by greater than 300%.

Many other full adder circuits which operate in the saturated mode are also well known. However, these adder circuits are inherently slower and inferior to the non-saturated adders.

SUMMARY OF THE INVENTION

An object of this invention is to provide a new and improved full adder operative in the high speed non-saturating current mode.

Another object of this invention is to provide a new and improved full adder logic element operative at relatively low power dissipation levels.

The present invention features a series-gated transistor tree circuit configuration for receiving binary logic signals which are applied to differentially connected transistors in multiple levels of logic within the circuit configuration. As multiple combinations of digits are applied to the transistors in the various logic levels of the circuit, logic functions and complements are generated at the output of the logic element in accordance with the particular combination of digits applied to the circuit and in accordance with the particular interconnections of the transistors in the various logic levels in the tree circuit configuration.

Another feature of this invention is the provision of a new and improved logic element which utilizes a transistor tree-like configuration for the generation of boolean functions in a non-saturated or current mode operation.

Another feature of this invention is the provision of parallel collector anding of the differentially connected transistors in one or more of the logic levels of the logic element. One transistor in each pair of differentially connected transistors in the output level of logic is connected to a one output resistor, and the other transistor in each transistor pair is connected to another output resistor, thus generating the "OR" operation in the output boolean expression for both the output function and its complement.

Briefly described, the logic element according to this invention includes a first level of logic generating transistors including first and second transistors connected to a current source and operatively biased to be differentially switched in the non-saturating current mode. The levels of logic generating transistors will be abbreviated herein as "logic levels." A first pair of transistors in a second logic level is connected to the first transistor in the first logic level, and a second pair of transistors in the second logic level is connected to the second transistor in the first logic level. Multiple combinations of binary logic signals (digits) are applied to the first and second transistors and to the individual transistors in the first and second pairs of transistors, and thereby open or close conductive paths through the first and second logic levels between an output circuit of the logic element and to a current source. This serial gating of the multiple logic levels generates a digital logic function, e.g., addition or substraction, at the output circuit of the logic element. Additional levels of logic generating transistors can be coupled between the output circuit of the logic element and the first and second logic levels described above in order to increase the logic capability of the element. The output circuit of the logic element includes one or more output resistance across which a digital output voltage is developed in response to the binary input signals which are applied to the emitter-coupled transistors in the various logic levels.

DESCRIPTION OF PREFERRED EMBODIMENTS

Identification of circuit components

Figures 1, 2:
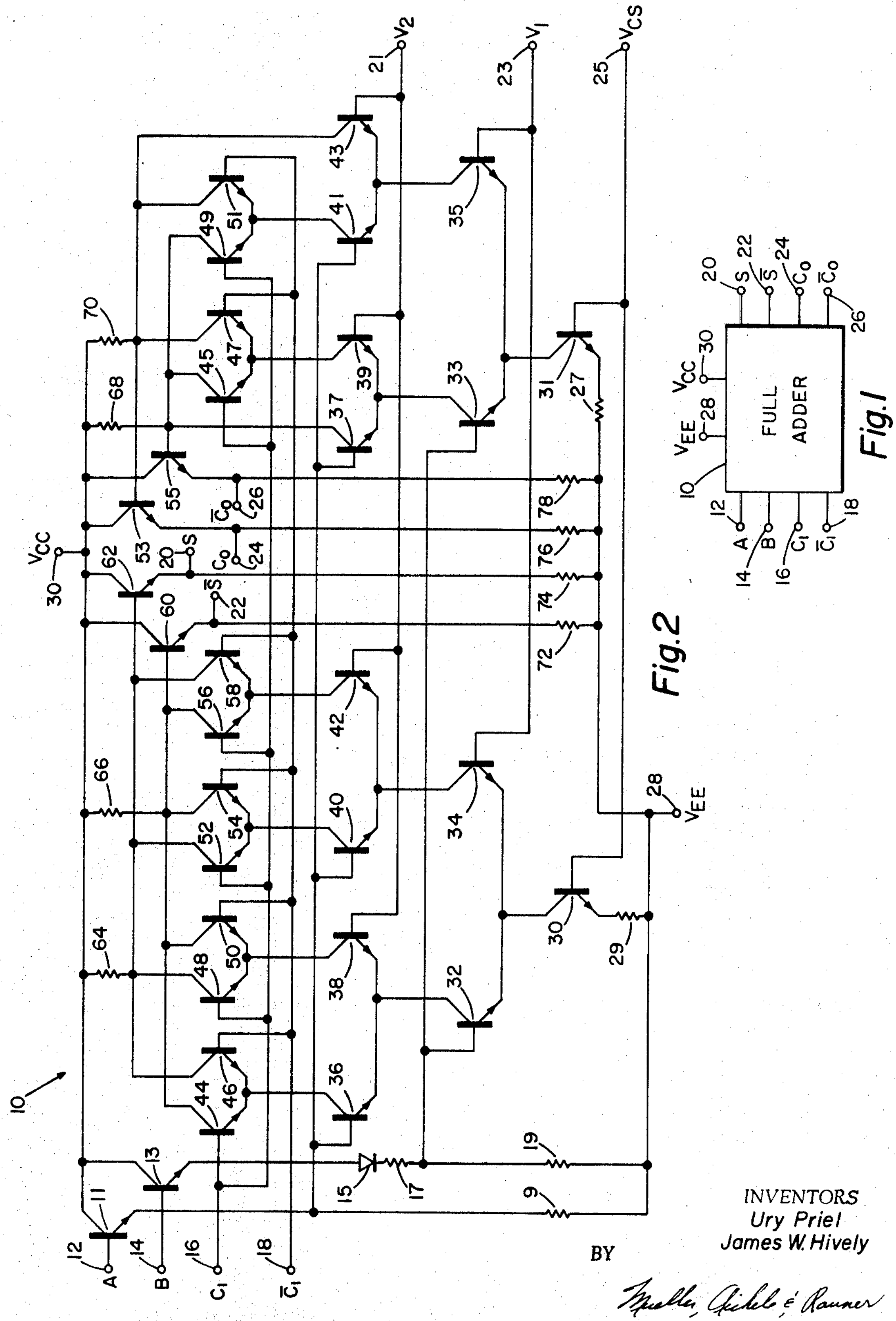
FIG. 1 is a block diagram of the full adder logic element according to this invention.
FIG. 2 is a schematic diagram of the integrated transistor circuitry embodying the full adder and connected in a transistor tree-like configuration.

Referring to FIGS. 1 and 2 in more detail, the block 10 represents the full adder logic element to be described below in detail with reference to FIG. 2 and includes input terminals 12 and 14 for receiving digital logic inputs represented as A and B. The inputs A and B are the addend and augend which are applied to the full adder 10, and the input carry function $C_i$ and its complement $\overline{C_i}$ are applied to the input terminals 16 and 18 respectively of FIG. 1. The SUM function S and its complement $\overline{S}$ are available at output terminals 20 and 22 respectively of the adder 10, and the carry out function $C_o$ and its complement $\overline{C_o}$ are available at the output terminals 24 and 26 respectively. The adder 10 is connected to an emitter supply potential $V_{EE}$ a terminal 28 and to a collector supply potential $V_{CC}$ at terminal 30.

Referring to FIG. 2 the A and B digital inputs are applied at input terminals 12 and 14 which are connected respectively to the bases of transistors 11 and 13. The A input is transmitted down one emitter-base voltage drop, $V_{BE}$, of transistor 11 and applied to the differentially connected transistors 36, 40, 37 and 41 in one logic level, and the B input is translated down one $V_{BE}$ at transistor 13, a diode drop at diode 15 and a resistance drop across resistor 17 before being applied to the differentially connected transistors 32 and 33 in a lower logic level. The $C_1$ and $\overline{C_1}$ inputs are connected directly to the bases of the differentially connected transistors in the top level of logic generating transistors, and these transistors are DC coupled to emitter-follower output stages. The emitter followers 60 and 62 provide compatible output levels of logic for driving other similar emitter-coupled logic circuitry.

The full adder logic element according to this invention includes multiple levels of logic generating transistors which form a sum and $\overline{\text{sum}}$ (S and $\overline{S}$) generating left hand circuit portion and CARRY and $\overline{\text{CARRY}}$ ($C_o$ and $\overline{C_o}$) right hand circuit portion of the circuit shown in FIG. 2. Included in a first level of logic generating transistors are first and second NPN emitter-coupled transistors 32 and 34 which are connected to a first current source transistor 30 and third and fourth NPN emitter-coupled transistors 33 and 35 which are connected to a second current source transistor 31. Both of the current source transistors 30 and 31 are biased by a reference potential $V_{CS}$ which is applied to terminal 25, and the second and fourth transistors 34 and 35 in the first logic level are biased at the base electrodes thereof by a reference potential $V_1$ which is applied to terminal 23.

Each of the first through fourth transistors 32, 34, 33 and 35 respectively are connected at the collectors thereof to other differentially connected emitter-coupled pairs of NPN transistors in a second level of logic generating transistors, and each transistor in the emitter-coupled pairs in the second level of logic generating transistor is in turn connected at the collector thereof to another emitter-coupled NPN transistor pair in a third or output level of logic generating transistors. However, the adder according to this invention is not limited to emitter-coupled pairs, and any transistor in any of the three logical level shown may be emitter-coupled in parallel with as many other transistors as desired for a particular digital circuit application. Additionally, the adder circuit shown in FIG. 2 may be modified by one skilled in the art to include other higher levels of logic generating transistors in accordance with the teachings of this invention.

Binary SUM and CARRY output signals and the complements of these signals for the full adder are derived from the emitters of the first, second, third and fourth emitter followers 60, 62, 53 and 55. These emitter-followers are connected via emitter-follower resistors 72, 74, 76 and 78 to a power supply terminal 28.

The current mode switching operation of the circuit shown in FIG. 2 will be more readily understood from the following description of the operation thereof. It will be appreciated by those skilled in the art that the circuit shown in FIG. 2 may be used as a subtractor as well as an adder.

OPERATION

Consider initially the Truth Table given below for a full adder circuit:

TRUTH TABLE FOR FULL ADDER

| A | B | $C_i$ | S | $C_0$ |
|---|---|---|---|---|
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 1 | 0 | 1 | 0 | 1 |
| 0 | 1 | 1 | 0 | 1 |
| 1 | 1 | 1 | 1 | 1 |

The foregoing Truth Table is well known to those skilled in the art of digital logic and is self-explanatory. The four minterms for which the sum functions are at a logical ONE level (using positive logic) may be expressed as $$S=A\overline{B}\overline{C}_i+\overline{A}B\overline{C}_i+\overline{A}\overline{B}C_i+ABC_i \qquad \text{(Eq. 1)}$$

and the carry out function $C_o$ is as a logical ONE level when $$C_o=AB\overline{C}_i+A\overline{B}C_i+\overline{A}BC_i+ABC_i \qquad \text{(Eq. 2)}$$

The circuit shown in FIG. 2 generates these functions and their complements in the non-saturated mode.

The differentially connected emitter-coupled reference transistors in the first and second logic levels of FIG. 2 are biased via reference potentials $V_1$ and $V_2$ which are applied at terminals 21 and 23 respectively. These reference potentials are midway in the logic swing of the differentially coupled signals which switch against these reference potentials. For example, the input signal A applied to transistor 11 is translated down the $V_{BE}$ of the transistor 11 and after such translation has a midswing logic potential equal to $V_2$. Likewise, the B input signal which is translated down by transistor 13, diode 15 and resistor 17 has a midswing logic potential equal to $V_1$. The current source reference potential $V_{CS}$ is applied to terminal 25 for biasing the current source transistors 30 and 31. $V_{CS}$ is lower than either $V_1$ or $V_2$, and the values of the bias potentials $V_1$, $V_2$ and $V_{CS}$ are such that the reference transistors 38, 42, 39 and 43 in the second level of logic generating transistors, the reference transistors 34 and 35 in the first level of logic generating transistors and the current source transistors 30 and 31 do not saturate. Using a −5.2 volt emitter supply $V_{EE}$ and a 0 volt collector supply $V_{CC}$, the values of $V_1$ and $V_2$ presented in the table below are used as reference potentials against which the A and B inputs switch.

When current flows through the collector output resistor 64 and into any one of a first group of transistors 46, 48, 52 or 58, the base of the output emitter-follower transistor 62 will be low and the SUM output signal S at terminal 20 will be at a logical ZERO level using positive logic. Similarly, when any one of a second group of transistors 44, 50, 54 and 56 is conducting, the base potential of emitter-follower output transistor 60 will be low and $\overline{\text{SUM}}$ output signal $\overline{S}$ at terminal 22 will be at a logical ZERO level. The differential type connection shown in FIG. 2 ensures that emitter followers 60 and 62 alternately exist at logical ONE.

The particular binary input condition for which the SUM signal S and the carry out signal $C_o$ will be at high or low (binary ONE or ZERO) logical levels respectively is given in the above truth table of the full adder circuit in FIG. 2, and the switching operation of this current mode full adder circuit will be apparent to those skilled in the art of digital logic upon reading the Truth Table.

The carry out function $C_o$ and its complement $\overline{C_o}$ are generated simultaneously with the S and $\overline{S}$ outputs, and $C_o$ and $\overline{C_o}$ are derived at the output terminals 24 and 26 of emitter-follower transistors 53 and 55 respectively. The emitter-follower output transistors 53 and 55 and the emitter-follower output transistors 60 and 62 serve as level translators as mentioned above in order that the DC output logical levels are compatible to the input levels of signals A, B and $C_i$.

The right hand circuit portion of FIG. 2 which generates the carry out functions $C_o$ and $\overline{C_o}$ differs somewhat from the left hand circuit portion thereof, i.e., the collectors of transistors 37 and 45 are anded with the collector of transistor 49 at the base of transistor 55, and the collectors of transistors 39 and 41 are serially connected respectively to a common output point of transistors 45 and 47 and a common output point of transistors 49 and 51. As in the left hand circuit portion of FIG. 2, only two output collector resistors are needed. A single collector resistor 68 is connected to a common output point of transistors 45 and 49, and a single collector output resistor 70 is connected to a common junction of the collectors of transistors 47 and 51 and 43. The particular connection in the right hand circuit portion of FIG. 2 results from a simplification of the Boolean expression for the carry out function $$C_o=AB\bar{C}_i+A\bar{B}C_i+\bar{A}BC_i+ABC_i \text{ to } C_o=AB+A\bar{B}C_i+\bar{A}BC_i$$

The addend A and augend B are single rail inputs while the carry input $C_i$ is a double rail input. The sum S and carry out $C_o$ are double rail outputs, but these outputs can be used in a single rail application if desired. By utilizing both the carry in function $C_i$ and its complement $\bar{C}_i$ for switching the third or output logic level of transistors in FIG. 2, the noise margin of the adder is greatly improved. The A and B inputs are compared with fixed reference potentials $V_1$ and $V_2$ in the lower levels of the transistor tree while the $C_i$ and $\bar{C}_i$ functions generate the switching on the top level of the transistor tree. This switching scheme results in the shortest function generating time delay from carry in to carry out.

The following table of values is given for a full adder circuit of the type shown in FIG. 2 which has been successfully built and tested in accordance with the teachings of this invention. However, these values should not be construed as limiting the scope of this invention.

TABLE OF VALUES

| Resistor: | Value |
|---|---|
| 9 | 1850 |
| 17 | 187 |
| 19 | 1090 |
| 27 | 175 |
| 29 | 175 |
| 64 | 300Ω |
| 66 | 300Ω |
| 68 | 300Ω |
| 70 | 300Ω |
| 72 | 1500 |
| 74 | 1500 |
| 76 | 1500 |
| 78 | 1500 |
| Voltages: | |
| $V_{CC}$ | 0 |
| $V_1$ | −3.025 |
| $V_2$ | −1.9 |
| $V_{CS}$ | −3.9 |
| $V_{EE}$ | −5.2 |

The circuit shown in FIG. 2 has been constructed in monolithic integrated form, but the claims appended hereto are directed to discrete component as well as integrated circuitry.

We claim:

1. A logic element including, in combination:

(a) a first level of logic generating transistors including first and second transistors connected to a current source and operatively biased to be differentially switched in the nonsaturating current mode, (b) a second level of logical generating transistors including a first pair of transistors connected to said first transistor and a second pair of transistors connected to said second transistor, the transistors in each of said first and second pairs of transistors alternately conducting current in the nonsaturating current mode and providing current flow to one of said first and second transistors having the highest logic potential applied thereto, (c) each transistor in said first and second pairs of transistors is connected to a separate pair of differentially connected transistors in a third level of logic generating transistors, one of said first and second transistors connectable to receive a first binary digit, one transistor in each of said first and second pairs of transistors connectable to receive a second binary digit, and at least one transistor in each separate pair of transistors in said third level of logic generating transistors connected to receive a carry digit in order to generate a SUM and complement function, (d) an output circuit coupled to said third level of logic generating transistors, said output circuit including first and second output stages having, respectively, first and second emitter-followers therein, said first emitter-follower DC coupled to one transistor in said each separate pair of transistors and said second emitter-follower DC coupled to the other transistor in said each separate pair of transistors, said first and second emitter-followers having output terminal means for providing output signals equal to the SUM and complement, respectively, of the first and second binary digits which are applied to said logic element, and (e) said output circuit means includes resistance means across which different logic levels are generated in accordance with multiple combinations of binary logic signals applied to said logical element, said resistance means connected between said third level of logic generating transistors and a power supply terminal.

2. The adder according to claim 1 wherein:

(a) said first level of logic generating transistors further includes third and fourth transistors connected to another current source, and (b) said second level of logic generating transistors further includes a third pair of transistors connected to said third transistor and a fourth pair of transistors connected to said fourth transistor, said transistors in each of said third and fourth pairs of transistors alternately conducting current and providing current flow respectively to the one of said third and fourth transistors having the highest logic potential applied thereto, said third and fourth transistors and the individual transistors in said third and fourth pairs of transistors connected to receive multiple combinations of binary logic signals to either close or open a conductive path to said output circuit and generate different logical levels across said resistance means in accordance with said multiple combinations of binary logic signals applied to said adder.

3. The adder according to claim 2 wherein:

(a) each transistor in said third and fourth pairs of transistors is connected to a further pair of differentially connected transistors in said third level of logic generating transistors, one of said third and fourth transistors connectable to receive a first binary digit, one transistor in each of said third and fourth pairs of transistors connectable to receive a second binary digit and one transistor in said further pair of transistors connectable to receive a carry in digit in order to generate a carry out function and its complement across said resistance means in said output circuit, and (b) said output circuit further including third and fourth output stages, said third output stage connected to one transistor in said further pair of transistors and said fourth output stage connected to another transistor in said further pair of transistors the carry out function generated at the output of said third output stage and the complement of the carry out function generated at the output of the fourth output stage.

4. The adder according to claim 3 wherein:

(a) said third and forth output stages include respectively third and fourth emitter-followers connected to one and the other of said transistors in said further pair of transistors in said third level of logic generating transistors, and (b) said resistance means in said output circuit includes first, second, third and fourth logic resistors connected between said first, second, third and fourth emitter-followers respectively and a voltage supply terminal for providing a resistive current path to said emitter-followers and for establishing desired bias potentials thereon.

5. A logic element which may be operated as a full adder including in combination:

(a) a SUM circuit portion having first, second and third levels of current switches therein connected in cascade across a pair of power supply terminals, the current switches in each of the first, second and third levels in said SUM circuit portion connected to differentially switch upon receiving selected binary logic signals, (b) a CARRY circuit portion having first, second and third levels of current switches therein connected in cascade across a pair of power supply terminals, the current switches in said first, second and third levels in said CARRY circuit portion connected to differentially switch upon receiving said selected binary logic signals, and (c) first, second and third input terminal means DC coupled respectively to said first, second and third levels of current switches in both said SUM and CARRY circuit portions of said logic element, so that said selected binary logic signals applied simultaneously to said first, second and third input terminal means simultaneously drive the current switches in the corresponding levels in the SUM and CARRY circuit portions of the logic element, thereby minimizing time delays and power dissipation in said logic element.

6. The logic element defined in claim 5 wherein:

(a) said first input terminal means includes a first input connector DC coupled to said first levels of current switches in both said SUM and CARRY portions of said logic element, (b) said second input terminal means includes a second input connector DC coupled to said second levels of current switches in said SUM and CARRY circuit portions of said logic element, and (c) said third input terminal means includes a pair of input connectors connected, respectively, to the differentially connected current switches in said third levels of current switches in both the SUM and CARRY circuit portions of the logic element, so that selected binary input logic signals applied to each of the said connectors simultaneously provide differential current switching in each of the SUM and CARRY circuit portions of the logic element, and (d) said SUM and CARRY circuit portions of the logic element each connected across a single pair of power supply terminals, and thereby minimizing power dissipation and switching time delay in the logic element.

7. The logic element defined in claim 6 wherein:

(a) said first level of current switches in the SUM portion of the logic element includes first and second transistors connected to a current source and operatively biased to be differentially switched against each other, (b) said second level of current switches in the SUM portion of the logic element includes a first pair of transistors connected to said first transistor and a second pair of transistors connected to said second transistor, (c) a plurality of pairs of differentially connected transistors in said third level of current switches in the SUM portion of the logic element, each of said plurality of pairs connected, respectively, to individual transistors in said first and second pairs of transistors in said second level of current switches, and (d) said input circuit means connected to said transistors in said first, second and third levels of current switches in said SUM portion of said logic element for simultaneously applying thereto binary logic signals for routing current through selected ones of said transistors in each of the first, second and third levels of current switches, thereby generating SUM and SUM complement output signals at the output of said third level of current switches.

8. The logic element defined in claim 7 which further includes first and second emitter-followers DC coupled to respective ones of the transistors in each of the plurality of pairs of transistors in said third level of current switches, with the SUM and SUM complement output signals derived from the output potentials of first and second emitter-followers.

9. The logic element defined in claim 8 which further includes:

(a) third and fourth transistors in said first level of current switches in said CARRY circuit portion, said third and fourth transistors connected to another current source across a pair of power supply terminals and further connected to be differentially switched by a first input logic signal, (b) said second level of current switches in said CARRY circuit portion including a third pair of transistors connected to said third transistor and a fourth pair of transistors connected to said fourth transistor, one transistor in each of said third and fourth pairs of transistors connected to receive a second input logic signal for differentially switching the transistors in said third and fourth pairs of transistors in said CARRY circuit portion, whereby current is routed from one of the transistors in said third and fourth pairs of transistors to one of said third and fourth transistors in said first level of current switches, and (c) first and second output pairs of transistors differentially connected in said third level of current switches in said CARRY circuit portion of said logic element, said first and second output pairs of transistors connected between selected ones of said transistors in said third and fourth pairs of transistors and a power supply terminal, and (d) third and fourth emitter-followers DC coupled, respectively, to said first and second output pairs of transistors, with the CARRY and CARRY-complement output signals derived, respectively, from the output potentials on said third and fourth emitter-followers, so that said logic element is operative to simultaneously generate the SUM and the CARRY functions and their complements at the outputs, respectively, of said first, second, third and fourth emitter followers.

10. The logic element defined in claim 9 wherein:

(a) one transistor in each of said third and fourth pairs of transistors in said CARRY circuit portion of said logic element is connected, respectively, to a separate output node for said first and second output pairs of transistors in said third level of current switches (b) the other transistors in each of said third and fourth pairs of transistors in said second level of current switches DC coupled to said third and fourth emitter-followers, and (c) one transistor in each of said first and second output pairs of transistors DC coupled to said third emitter-follower and the other transistor in each of said first and second pairs of output transistors DC coupled to said fourth emitter-follower, said third and fourth emitter-followers providing the CARRY and CARRY complement output signals in response to the selective current routing in said CARRY circuit portion of said logic element.

References Cited

UNITED STATES PATENTS

| | | | |
|---|---|---|---|
| 3,040,192 | 6/1962 | Slobodzinski | 307—216 X |
| 3,291,973 | 12/1966 | Rasche | 307—216 X |
| 3,291,974 | 12/1966 | Even | 235—176 |
| 3,296,424 | 1/1967 | Cohn | 235—176 X |
| 3,407,357 | 10/1968 | Spandorfer et al. | 235—176 X |

MALCOLM A. MORRISON, Primary Examiner

J. F. RUGGIERO, Assistant Examiner

U.S. Cl. X.R.

307—216